E. M. LONG.
LENS CENTERING AND TRANSFER DEVICE.
APPLICATION FILED JUNE 30, 1916.
1,208,343.
Patented Dec. 12, 1916.
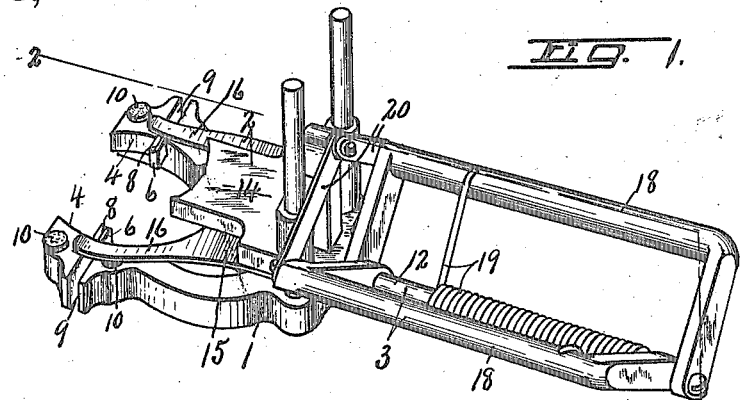
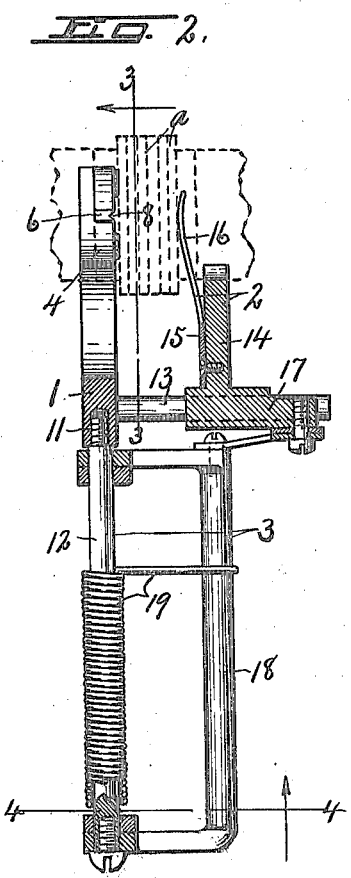
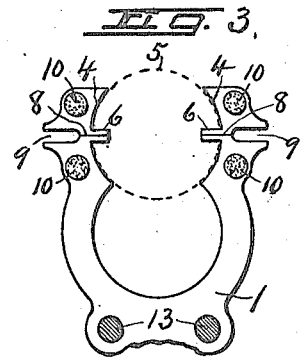
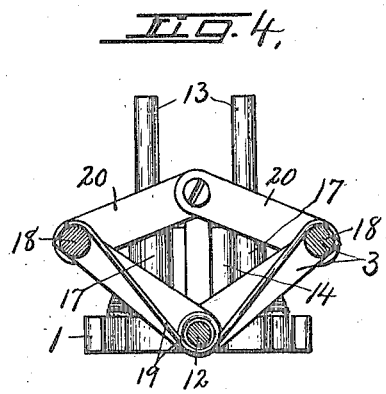
WITNESSES:
INVENTOR
E. M. Long
BY Howard P. Denison
ATTORNEY

UNITED STATES PATENT OFFICE.

ELI MAYNARD LONG, OF GENEVA, NEW YORK, ASSIGNOR TO THE STANDARD OPTICAL COMPANY, OF GENEVA, NEW YORK, A CORPORATION OF NEW YORK.

LENS CENTERING AND TRANSFER DEVICE.

1,208,343.

Specification of Letters Patent.

Patented Dec. 12, 1916.

Application filed June 30, 1916. Serial No. 106,910.

*To all whom it may concern:*

Be it known that I, ELI MAYNARD LONG, a citizen of the United States of America, and resident of Geneva, in the county of Ontario, in the State of New York, have invented new and useful Improvements in Lens Centering and Transfer Devices, of which the following, taken in connection with the accompanying drawings, is a full, clear, and exact description.

This invention relates to a device for centering and placing lenses in the rotary holders of edge grinding machines so that their mechanical and optical axes will coincide with the corresponding axes of the former, commonly used in that type of machine.

The main object is to provide a more advantageous and expeditious means for centering, gripping and releasing the lenses preparatory to placing them between the rotary clamping members of the edge grinder. In other words, I have sought to operate the movable jaws of the gripping device by movable means constituting a part of the handle so that such device may be held and manipulated in one hand, while the other hand is free to adjust the lenses therein.

Other objects and uses relating to specific parts of the device will be brought out in the following description.

In the drawings Figure 1 is a perspective view of a device of this character embodying the various features of my invention. Fig. 2 is a longitudinal sectional view of the same taken on line 2—2, Fig. 1. Figs. 3 and 4 are detail sectional views taken, respectively, in the planes of lines 3—3 and 4—4, Fig. 2.

As illustrated, this device comprises a pair of lens-clamping jaws —1— and —2— movable one in relation to the other by suitable operating means constituting a handle —3— by which the entire device with or without the lenses therein may be held in one hand or carried from place to place, all of the parts being preferably made of suitable metal. The jaw —1— is substantially flat and symmetrically U-shape, the inner edges of the outer ends of the opposite arms thereof being provided with concave concentric seats —4— of the same radius adapted to be placed coaxial with and to engage the periphery of a cylindrical part —5— of the lens-holder of an edge grinding machine, not shown, so as to accurately center the lens in the machine when making the transfer. The arms of the jaw —1— are also provided with relatively short lugs —6— projecting inwardly and radially toward each other from the concave seats and adapted to enter suitable recesses (not shown) in the member —5— for properly registering the axes of the lenses with the corresponding axes of a former, commonly used in edge-grinding machines, but not herein shown, said lugs being provided with index lines —8— which are also radial to the concave seats to facilitate the proper positioning of the lenses in the holder by registering their marked axes with such lenses. The opposite arms of the jaw —1— are also provided with slots —9— opening from the outer edges thereof radial to the center of the concave seats —4— and in alinement with the inwardly projecting lugs —6— for the purpose of further facilitating the proper adjustment of the lenses of the centering device by permitting the drill holes for the mounting to be registered with the slots.

Suitable means is provided for frictionally retaining the lens adjacent the jaw —1— in its adjusted position, and for this purpose the inner faces of the opposite arms of said jaw are provided with frictional contact members —10— symmetrically arranged in pairs equally distant from and at opposite sides of the center of the concave seats —4—, those of each pair being also disposed equally distant from and at opposite sides of the medial line —8—.

The face of the jaw —1— is provided with a central threaded aperture —11— extending radially with reference to the center of the concave seats —4— and at right angles to the medial lines —8— for receiving the threaded end of a handle bar —12— which extends in the same direction from the base of the jaw a sufficient distance to constitute a part of the handle —3—. A pair of guide pins —13— are secured in spaced relation to the base of the jaw —1— and extend laterally from the inner face thereof in parallelism with each other and with the axis of the concaved faces —4— for receiving and supporting the relatively movable jaw —2—. This movable jaw preferably comprises a substantially flat rigid plate —14— and a bifurcated resilient plate —15— secured to the inner face of the rigid block or plate —14— and provided with outwardly projecting resilient spring arms —16— adapted to bear against the face of the adjacent lens, as shown by dotted lines in Fig. 2, for yieldingly holding all of the lenses, as —a—, together in their adjusted position between the jaws, the rigid plate or block —14— being provided at one end with a hub —17— having apertures for receiving the pins —13— and permitting the movement of the jaw —2— along said pins without binding. The opposite end of the plate or block —14— is concaved and concentric with the axis of the concave seats —4— to engage the periphery of the adjacent lens-clamping member of the edge grinding machine, not shown, and thereby further facilitating the centering of the lenses in said holder.

A pair of U-shaped levers or rock arms —18— are journaled upon the rod —12— to move toward and from each other against the action of a retracting spring —19— and constitute collapsible portions of the handle, the ends of said levers adjacent the jaws being connected to the movable jaw by links —20— forming with the levers —18— toggle connections between the two jaws for opening said jaws as the levers are brought together under pressure of the hand against the action of the spring —19— which automatically distends said levers to close the jaws upon the interposed lenses.

The free ends of the spring arms —16— are adapted to engage the lenses under yielding pressure at points between the friction contacts —10— of the opposite jaw or in approximate alinement with the axis lines —8—, (the space between the arms being substantially equal to the diametrical distance between the concave seats —4— of the jaw —1—) and are relatively narrow so as to leave the greater portions of the slots —9— exposed when the lenses are clamped between the jaws. In placing the lenses in this centering device the handle including the levers —18— are grasped in one hand and the levers compressed to open the jaws, whereupon the lenses may be placed in superposed relation between said jaws and properly adjusted to aline their optical or major axes with the lines —8— on the jaw —1—, or if the drill holes for the mounting are located in said axis, they will also be registered with the slots —9—. When the lenses are properly adjusted, the pressure upon the levers —18— is sufficiently relieved to allow the spring —19— to retract the same for closing the jaws upon the lenses under yielding pressure of the spring arm —16— which reduces the liability of breakage or cracking of the glass in case the jaws are closed suddenly.

It will be observed that the manner of guiding the lens-clamping jaws one upon the other, together with the specific form of operating means, causes them to move in parallelism so as to effect a more positive clamping of the lenses together by direct pressure parallel with the axes thereof.

What I claim is:

1. In a device for centering and placing lenses in edge grinding machines, the combination of a pair of jaws spring-pressed toward each other, and means for opening the jaws against the action of the spring including a handle bar movable transversely to the plane of movement of the jaws.

2. In a device of the character described, the combination of a pair of jaws spring-pressed toward each other, one of the jaws having a yielding lens-engaging portion, and hand-operated means for opening the jaws against the action of the spring.

3. In a device of the character described, the combination of a pair of jaws spring-pressed toward each other, one of the jaws having spring fingers for engaging the adjacent lens, and hand-operated means for opening the jaws.

4. In a device of the character described, the combination of lens-clamping jaws movable one in relation to the other, guiding means for said jaws to cause them to move in parallelism, and means operatively connected to said jaws and movable relatively thereto for operating one of the jaws along the guiding means in relation to the other jaw.

5. In a device of the character described, the combination of a pair of lens-clamping jaws, a handle having a movable member connected to one of the jaws to open the same, and a retracting spring for the movable member to close said jaw.

6. In a device of the character described, the combination of lens-clamping jaws and operating means therefor including a handle bar pivoted to one jaw to swing transversely to the plane of movement of said jaws, and means for transmitting motion from said handle bar to the other jaw.

7. In a device of the character described, the combination of a pair of lens-clamping jaws, a hand lever pivoted to one of the jaws, connections between the lever and other jaws for opening the same, and a retracting spring for the lever to close such jaw.

8. In a device of the character described, the combination of a pair of lens-clamping jaws, a handle having relatively movable levers, and connections between them and the jaws for opening the same, and a retracting spring for the levers.

9. In a device of the character described, the combination of a pair of lens-clamping jaws, a handle having relatively movable levers and connections between them and the jaws for opening the same, and a retracting spring for the levers, one of the jaws being provided with a yielding lens-engaging member.

10. In a device of the character described, the combination of a pair of lens-clamping jaws, guiding means to cause the jaws to move in parallelism, a hand-lever pivoted to one jaw to swing about an axis at substantially right angles to the plane of said guiding means, and means for transmitting motion from said hand-lever to the other jaw.

11. In a device of the character described, the combination of lens-clamping jaws and toggle connections between said jaws for moving one jaw in relation to the other jaw, and a spring for operating the toggle to close the jaws.

12. In a device of the character described, the combination of a pair of lens-clamping jaws movable one in relation to the other, means for guiding the jaws in parallelism in all positions of adjustment and operating means for said jaws comprising a handle bar secured to one jaw, a pair of hand-levers pivoted to said bar, and toggle connections between said hand-levers and the other jaw.

In witness whereof I have hereunto set my hand this 15th day of June, 1916.

ELI MAYNARD LONG.

Witnesses:
 ALBION W. NEWELL,
 E. R. BURROUGHS.